United States Patent [19]
Ueda et al.

[11] 3,779,141
[45] Dec. 18, 1973

[54] APPARATUS FOR CONTROLLING AN ELECTRONIC FLASH

[75] Inventors: Hiroshi Ueda, Nara; Kayoshi Tsujimoto, Osaka, both of Japan

[73] Assignee: Minolta Camera Kabushiki Kaisha, Osaka-shi, Osaka-fu, Japan

[22] Filed: Dec. 17, 1971

[21] Appl. No.: 209,044

[30] Foreign Application Priority Data
Dec. 19, 1970 Japan.............................. 45/113589
Feb. 6, 1971 Japan................................ 46/4917
Aug. 4, 1971 Japan................................ 46/58251

[52] U.S. Cl........... 95/10 CE, 95/10 PO, 95/53 EB, 240/1.3, 250/215
[51] Int. Cl........ G03b 7/08, G03b 15/05, G01i 1/04
[58] Field of Search........... 95/10 C, 10 CE, 10 CT, 95/11.5 R, 42, 10 PO, 53 EB; 240/1.3; 250/215

[56] References Cited
UNITED STATES PATENTS
| | | | |
|---|---|---|---|
| 3,541,387 | 11/1970 | Ackermann | 95/10 CT UX |
| 3,353,462 | 11/1967 | Suzuki | 95/53 EB |
| 3,180,218 | 4/1965 | Durst | 95/10 PO X |
| 3,474,242 | 10/1969 | Forrant | 240/1.3 |
| 3,568,582 | 3/1971 | Uchida | 95/10 CT X |
| 3,601,022 | 8/1971 | Langman | 95/10 C |

*Primary Examiner*—Joseph F. Peters, Jr.
*Attorney*—Watson, Cole, Grindle & Watson

[57] ABSTRACT

An exchangeable lens barrel for use in a photographic camera is provided with a light sensitive element which, when the exchangeable lens barrel has been exactly fitted to the camera, receives the light which is reflected from the light sensitive film surface after it is transmitted through the objective lens and the iris aperture of the exchangeable lens barrel. A control system for an electronic flash tube in the camera or an electronic flash device fitted to the camera comprises a lighting control circuit and includes a timing circuit which controls the lighting of the electronic flash tube. The timing circuit is connected with the light sensitive element to generate a current which is integrated by the timing circuit, and the electronic flash tube is extinguished when the integrated voltage reaches a certain predetermined level, thereby the opening of the iris aperture in the exchangeable lens barrel is transmitted to the control circuit.

10 Claims, 10 Drawing Figures

APPARATUS FOR CONTROLLING AN ELECTRONIC FLASH

BACKGROUND OF THE INVENTION

The present invention relates to apparatus for controlling an electronic flash, and more particularly, to such apparatus having an exchangeable lens barrel which is provided with a light sensitive element for receiving, when the barrel is exactly fitted to the photographic camera body, the reflected light of the imaging lightrays of an object field. The light is reflected from the light sensitive film surface after passing through the objective lens and the iris aperture of the lens barrel at the time of an exposure. A current generated by the light sensitive element is integrated by an electronic flash lighting circuit means in the camera or in an electronic flash device, and when the integrated voltage reaches a certain predetermined level, the electronic flash tube is extinguished by the electronic flash circuit means.

In electronic flash photography, an electronic flash device of the automatic light adjusting type has been heretofore well known, which device is of the type which receives the reflected light from an object illuminated by the lighting of an electronic flash tube and controls the lighting time of the electronic flash tube. Nevertheless, in flash photography, the factors by which an exposure is determined include the iris aperture setting of the objective lens in the camera and the sensitivity of the film, as well as the brightness of an object which is illuminated by a flash device.

Therefore, in such an automatic light adjusting means as described above, even if a light sensitive element receives the reflected light from an object and controls the lighting time of the electronic flash tube, so long as the light sensitive element is not of the type which receives the light only transmitted through the objective lens and the iris aperture, the iris aperture setting will not be transmitted to the automatic light adjusting means. Therefore, the lighting of the electronic flash tube for obtaining an appropriate exposure can not be controlled, and it becomes necessary to manually set the aperture information separately into the electronic flash control circuit.

OBJECT OF THE INVENTION

It is the first object of the present invention to provide apparatus capable of controlling the lighting of an electronic flash by the transmission of the iris aperture setting to an electronic flash control circuit which controls the lighting time of the electronic flash.

It is another object of the present invention to provide apparatus capable of transmitting the iris aperture setting to a circuit for controlling the lighting time of the electronic flash so that the flash device exactly adjusts an exposure relative to a principal object in any object field.

It is still another object of the present invention to provide apparatus for the purpose of obtaining an appropriate exposure by automatically adjusting the lighting time of the electronic flash.

SUMMARY OF THE INVENTION

The present invention relates to apparatus in which, for the purpose of attaining the objects described above, the exchangeable lens for the photographic camera is provided with a light sensitive element for receiving, when the exchangeable lens barrel is exactly fitted on the photographic camera body, the reflected light of the imaging lightrays of an object field. The light is reflected from the light sensitive film surface after projecting through an objective lens and an iris aperture thereof at the time of an exposure. The reflected light is used to generate a current which is integrated, and when the integrated voltage reaches a certain predetermined level, the lighting of the electronic flash is extinguished by the control circuit.

DESCRIPTION OF THE PREFERRED EMBODIMENT

Figure 1:
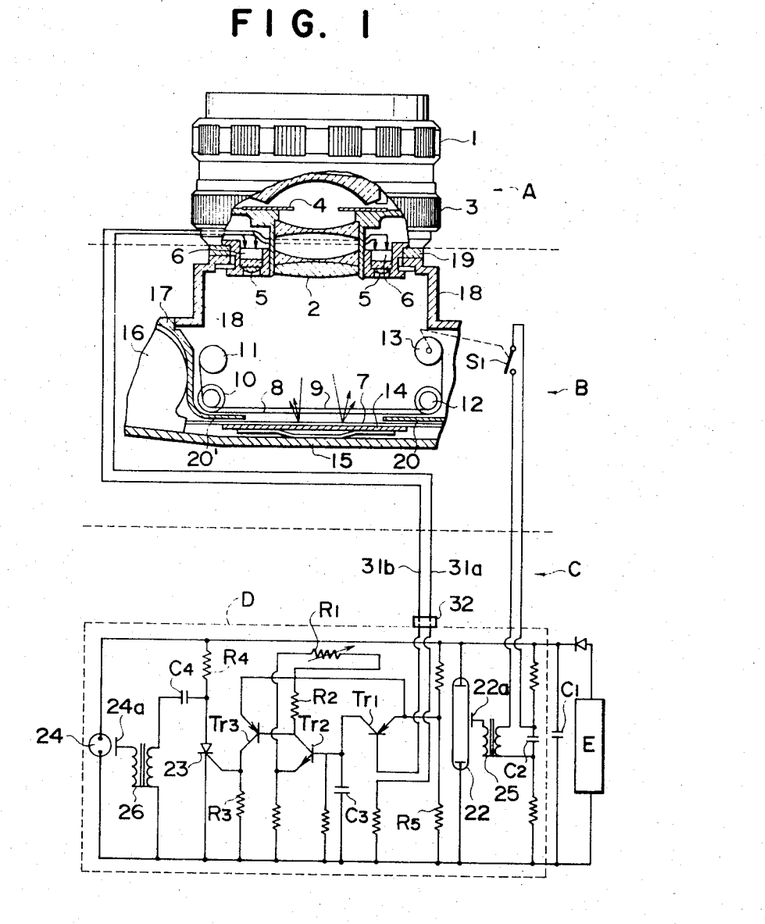
FIG. 1 shows a partially broken top view illustrating the the essential components of an embodiment of an exchangeable lens barrel, and a wiring diagram illustrating an electronic flash lighting control circuit in accordance with the present invention.

Section A in FIG. 1 is an exchangeable lens barrel provided with a light sensitive element which receives the light reflected from the film surface in a camera. Section B is the main body of a camera provided with an objective lens which is also exchangeable, and shown in the section C is an example of an electronic flash circuit of an automatic light adjusting type which automatically controls the lighting time by integrating a current generated due to the reflected light received by the light sensitive element in section A. The exchangeable lens barrel carries out the distance adjustment as the objective lens 2 is slid forewards or backwards by the turning of distance ring 1 through a well-known helicoid mechanism not shown in the drawing. The iris aperture setting of an aperture blade 4 which advances and retreats in accordance with objective lens 2 is set by the turning of an aperture ring 3.

The reference numeral 6 denotes a pair of light sensitive elements which are mounted at the periphery of the back face of the exchangeable lens barrel and located at such positions so as not to interfere with light transmitted through the objective lenses and the iris aperture. The light sensitive elements are provided in front thereof with respective light receiving lenses 5 each of which is located at a position slightly nearer to the optical axis of the objective lenses than light sensitive elements 6. Also the optical axis is directed to the central portion of film 7.

Section B includes a camera body 17 provided on its back face with a rear lid 15 and on its foreface with a front plate 18. At the foremost end of the front plate 18 is a lens mount such as, for example, a bayonent mechanism which enables the exchangeable lens to be removable mounted.

Between the camera body 17 and the rear lid 15 is a film cartridge 16 which stores the photosensitive film 7, and in front of the film conveying path within the camera body 17, a leading screen 8 of the focal plane shutter consisting of two screens is spread over the space between winding-up axle 13 and rewinding spring drum 10. A trailing screen 9 is spread between winding-up axle 12 and rewinding spring drum 11. FIG. 1 shows the situation at the time when the running of the leading screen 8 has just finished and immediately prior to the closing of a synchronous switch $S_1$ at the contact point X.

Further, respectively connected in parallel with respect to a voltage power source E are a main capacitor $C_1$, a trigger capacitor $C_2$ having resistors connected to each terminal thereof and connected through the resistors to the voltage power source E, an electronic flash tube 22, a semiconductor control element 23 connected thereto through a resistor $R_4$, and a discharge tube 24. The main capacitor $C_1$ is charged by the voltage power source E and ignites electronic flash tube 22. Connected to the both ends of and in series with the trigger capacitor $C_2$ is synchronous switch $S_1$, which becomes conductive concurrently with the opening of the shutter in the main body of the camera; and the primary winding of a transformer 25, and a terminal of the secondary winding of the transformer 25 is connected to the trigger electrode 22a of the electronic flash tube 22. Independently of the aforementioned parallel circuit, the base of a transistor $Tr_1$ is connected via a resistor $R_5$ and the light receiving element 6 in the exchangeable lens A to one terminal of the voltage power source E. The light sensitive element preferably has a rapid response characteristic such as, for example, a selenium photocell, a silicon photocell, or the like.

The collector of transistor $Tr_1$ is wired to an integrating capacitor $C_3$ and to the base of transistor $Tr_2$.

The collector of transistor $Tr_2$ is wired to the base of transistor $Tr_3$, and the emitter of transistor $Tr_1$ and the emitter of transistor $Tr_3$ are wired to each other. Interposed in series between the collector and emitter of transistor $Tr_2$ are variable resistor $R_1$ which is arranged in the electronic flash circuit C and fixed resistor $R_2$.

The collector of transistor $Tr_3$ is wired not only to fixed resistor $R_3$ but also to the gate of semiconductor control element 23.

Connected in parallel with semiconductor control element 23, which is wired via resistor $R_4$ to voltage power source E, is a series connection of capacitor $C_4$ and the primary wiring of transformer 26. Connected to one end of the secondary wiring of transformer 26 is trigger electrode 24a of discharge tube 24. Discharge tube 24 should have an impedance less than that of electronic flash tube 22.

When leading screen 8 is opened and synchronous switch $S_1$ is closed by the release operation, the charged voltage of trigger capacitor $C_2$ is applied to trigger electrode 22a through transformer 25 so that electronic flash tube 22 is triggered. Thereby, the electronic flash tube is lit while the electric charge of main capacitor $C_1$ is discharged, and the light therefrom is reflected from an object while the status of the light is affected by the distance therefrom to the object or by the surrounding environment. The reflected light is transmitted through objective lens 2 and iris aperture 4 in the exchangeable lens barrel A of the camera to expose film 7 to the light. The light is further reflected from film 7 to light sensitive elements 6. Consequently, the current generated therein in response to the light exposing film 7 is amplified by transistor $Tr_1$, and integrating capacitor $C_3$ is charged by the amplified current which flows between the emitter and the collector of transistor $Tr_1$.

Since the incident light incoming at this time to light sensitive elements 6 is the light which has passed through iris aperture 4, the iris aperture setting in the exchangeable lens barrel A has been added to the current charged by integrating capacitor $C_3$.

Therefore, if the film sensitivity is added by means of variable resistor $R_1$ in the electronic flash circuit C to the circuit connecting the collector and the emitter of transistor $Tr_2$ which is operated by the voltage of integrating capacitor $C_3$, this information controls the trigger level of the electronic flash time control circuit.

When the voltage of integrating capacitor $C_3$ is reached the trigger level of transistor $Tr_2$ determined by variable resistor $R_1$ which is varied according to the film sensitivity and by the fixed resistor $R_2$, transistor $Tr_2$ becomes conductive. Concurrently, transistor $Tr_2$ also becomes conductive so as to apply the trigger voltage to the gate of semiconductor control element 23 which in turn becomes conductive. Consequently, the discharge of capacitor $C_4$ is started at the same time and the discharge current flows through the primary winding of transformer 26, so that the voltage induced in the secondary wiring is applied to trigger electrode 24a of discharge tube 24, accordingly, triggered discharge tube 24 begins to discharge the residual charge of main capacitor $C_1$. Since impedance of the discharge tube 24 is less than the impedance of electronic flash tube 22, electronic flash tube 24 is extinguished simultaneously with the beginning of the discharge of discharge tube 24.

In the embodiment shown in FIG. 1, the electronic flash circuit C and the exchangeable lens barrel A are completely separated, and the aforementioned description of the embodiment was primarily so that it could be easily understood. However, it is of course possible that, for instance, any one of the components within broken line D included in electronic flash circuit means C, namely electronic flash tube 22 as only an example thereof, can be rearranged in exchangeable lens barrel A.

Moreover, in lieu of controlling the lighting of the electronic flash tube 22 by the aforesaid method to have the lighting extinguished, that method involving the discharging of main capacitor $C_1$ by the discharge tube 24 having its impedance less than the impedance of the electronic flash tube 22, a switching means, for example, such as shown in U.S. Pat. No. 3,591,829 may be provided instead so as to make it possible to disconnect electronic flash tube 22 from main capacitor $C_1$.

Figure 2:
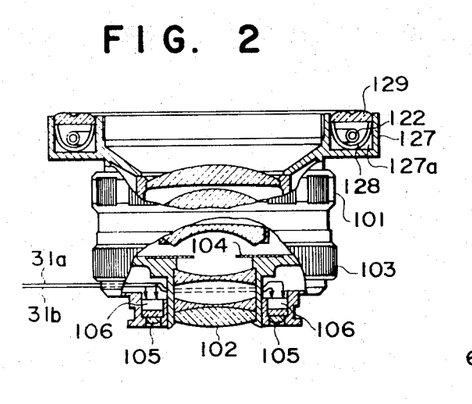
FIG. 2 is a partially broken top view showing the second embodiment of the present invention.

With reference to FIG. 2, a discharge tube holding frame 127 of the channel type is provided at the forward end of an exchangeable lens barrel so as to form a flange, and an electronic flash tube 122 shaped into the form of a ring is mounted along the center circle within the annular channel 127a of the discharge tube holding frame 127. Mounted along the back of frame 127 is mirror 128 shaped into the form of a ring with its section approximately in the form of a parabola. Mounted along the forward opening of annular channel 127a is a ring-like lens 129 having a juxtaposed annular semicylindrical form. A pair of light sensitive elements 106 and a pair of light receiving lenses 105 are respectively arranged at the rear side of the lens barrel similar to the arrangement in the first embodiment. The reference numeral 102 therein denotes an objective lens, and 104 is an iris diaphragm.

Furthermore, it is of course possible, in the aforementioned construction, that comparatively smaller circuit components within the enclosure D are arranged on the exchangeable lens barrel side A, and comparatively larger circuit components such as main capacitor $C_1$, voltage power source E for electronic flash tube 22, and the like are arranged on the main body side B of the camera.

In accordance with the construction of the first and second embodiments, the appropriate exposure control in many cases of flash photographing by means of an electronic flash can be carried into effect. However, the use of the flash is not limited to the photographing of a principal object in a dark place, but is sometimes adapted to, for instance, the photographing of a principal object in a bright counter-light. In such a case, according to the present invention, the output of the light receiving element due to the counter-light in the background is additionally integrated, resulting in such a defect that the exposure time is too short with respect to the principal object.

Such a phenomenon as described above is not restricted to flash photograph in counter-light, and even in flash photograph in a dark place. There is a special case where an object having a large reflecting power and a broad reflecting surface area is located in the foreground of the principal object and the object is also photographed together with the principal object. The light reflected on the film surface is incident upon the light sensitive element similarly as in the aforesaid case of the counter-light. This incident light impairs the appropriate exposure of the principal object so as to create a considerable error therein.

Therefore, in order to solve this problem, a study concerning the reflected light on the film surface was first carried out and indicated that there are two kinds of lightrays in the reflected light. One in a component reflected on the film surface regularly which follows the reflecting principle, and the other kind which is a separate component thereof that penetrates, the photosensitive layer, and was irregularly reflected, in the interior of the photosensitive layer, by the particles of the photosensitive substance, the binding agent and the like composing the photosensitive layer. Those light rays are diffusively reflected on the film surface. It was also discovered that the former component was by far the greater component in a specific direction.

Figure 3:
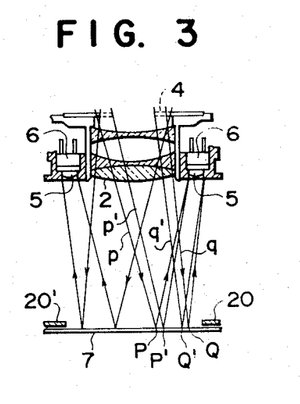
FIG. 3 is an illustrative view with an exchangeable lens barrel of the first embodiment fitted on a camera of the lightrays transmitted through the objective lens and reflected from the film surface to the light sensitive element.

Accordingly, the incoming condition of the regularly reflected light in the first and second embodiments described above was investigated. Referring to FIG. 3, reference numeral 4 denotes an iris aperture of which the full opened status is shown by the full lines, and a status reduced to some aperture value is shown by the broken lines. The light from an object passes through iris aperture 4 and is imaged on film 7 by objective lens 2, film 7 being disposed between exposure window frames 20 and 20'.

Since it is necessary that a pair of light sensitive elements 6, and a pair of their respective lenses 5 are mounted at positions where the imaging light of the objective lens 2 is not interfered thereby, they are arranged outside of both sectional sides of objective lens 2 as shown in the drawing.

Accordingly, if the range of the light incoming to light sensitive elements 6 after being regularly reflected on film surface 7 selectively out of the light which passes through iris aperture 4 and is imaged on film surface 7 is taken into consideration, the limits of the range are the light-rays shown by the two lines $p$ and $q$ in the case of the iris aperture 4 fully opened. The light therebetween corresponds to imaging light composing the picture image between two positions P and Q of a picture. Similarly in the case where the iris aperture 4 is reduced to the status shown by the broken lines, the ight incoming to light sensitive element 6 after being reflected on the surface of film 7 is shown by lines $p'$ and $q'$, and this light corresponds to the picture image between two positions P' and Q' on the surface of film 7.

Figure 6:
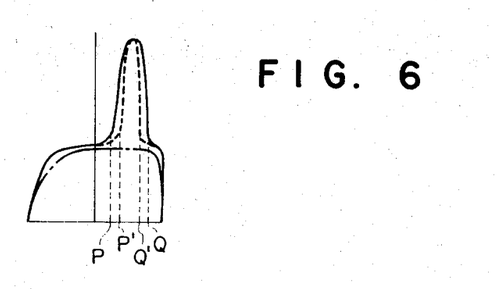
FIG. 6 is a graphic diagram showing the output characteristics of a light receiving element in relation to a film surface where either one of the exchangeable lens barrels according to the first and third embodiments is mounted on a camera.

Consequently, if it is assumed that the object has a uniform brightness (including the case where it is illuminated by an electronic flash), the distribution of the reflected light incident upon light sensitive element 6 is made up as shown in FIG. 6, thereby the output characteristics of light sensitive element 6 corresponding to the film surface 7 will be represented by an identical diagram. Therefore, this indicates that, so long as there is no foreground object having a large reflecting power nor any bright portion owing to the counter-light within the range between P and Q (with the iris aperture fully opened) or between P' and Q', the electronic flash can be controlled so as to permit the exposure of a principal object. However, if any foreground object having a large reflecting power and included in this range is to be photographed, the electronic flash can not be controlled so as to be able to provide an appropriate exposure.

In a third embodiment of the present invention, mounted in front of the light receiving face of light sensitive elements 206 is a light shielding plate 221 which is capable of shielding the light regularly reflected on the film surface between the two positions P and Q thereof. Thus, the peak between two points P and Q in FIG. 6 can be eliminated so that the output directional characteristics of light sensitive elements 6 with respect to the picture image on film surface 7 is modified as shown by the chain line. It is therefore possible to control the electronic flash so as to obtain an appropriate exposure of the principal object without regard to the condition of the object field for the flash photograph.

Figure 4:
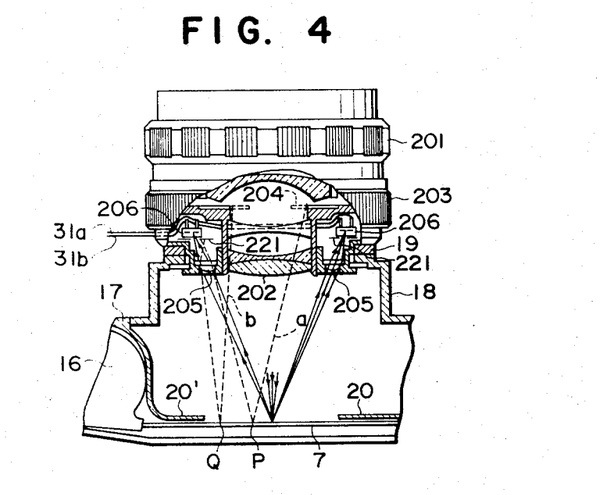
FIG. 4 is a partially broken top view showing the essential components of the third embodiment of an exchangeable lens barrel in accordance with the present invention.
Figure 5:
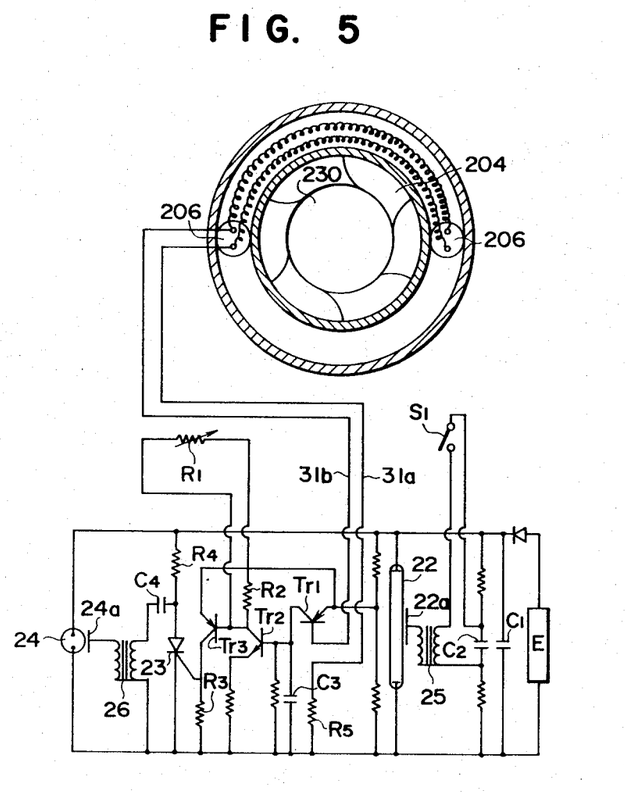
FIG. 5 shows a sectional front view of the same embodiment as depicted in FIG. 4, and a wiring diagram of an electronic flash lighting control circuit.

FIG. 4 shows a camera body and its associated lens barrel in partial section as the third embodiment of the present invention, and FIG. 5 shows in combination an electronic flash circuit, an output integrating circuit of the light-sensitive elements and a lighting control circuit in the third embodiment shown in FIG. 4.

Referring to FIGS. 4 and 5, the components therein equivalent to the first embodiment shown in FIG. 1 are iris aperture 204, objective lens 203, film 7 and exposure window frames 20 and 20′. The additional components comprise a pair of light sensitive elements 206 and such as, for example, selenium cells, silicon photocells or the like having a speedy response characteristic and disposed not only symmetrically with respect to the optical axis of objective lens 202 but also exteriorly on both sides thereof so that the imaging light of objective lens 202 is not interfered thereby. But the light receiving face thereof is still facing the film surface. Also a pair of lenses 205 are mounted in front of light sensitive elements 206 and proximate to the optical axis side of objective lens 202 nearer than light sensitive elements 206, and a pair of light shielding plates 221 are interposed between light sensitive elements 206 and lenses 205 so as to shield the reflected light regularly reflected on the film surface selectively out of the imaging light in the case of the iris aperture being fully opened and especially to shield the regularly reflected light incoming thereto from the peripheral portion of the picture surface. In addition, the lighting control circuit for the electronic flash tube is, as shown in FIG. 5, completely similar to that of the first embodiment.

Figure 7:
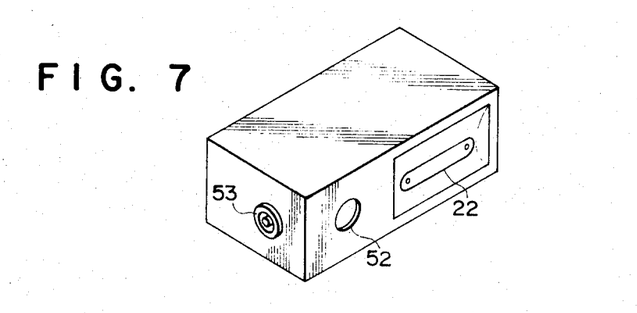
FIG. 7 is a perspective view showing the outside appearance of an embodiment of an electronic flash device using an exchangeable lens barrel in accordance with the present invention.
Figure 8A:
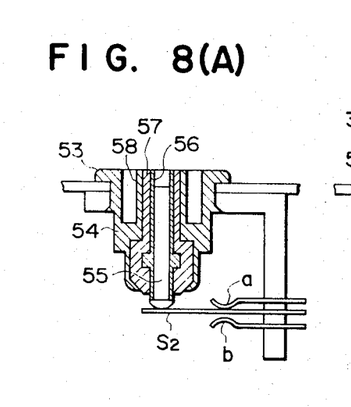
FIGS. 8A and 8B are section views each of which depicts a part of a connecting cord for connecting an exchangeable lens barrel and a change-over switch in the embodiment shown in FIG. 7.
Figure 8B:
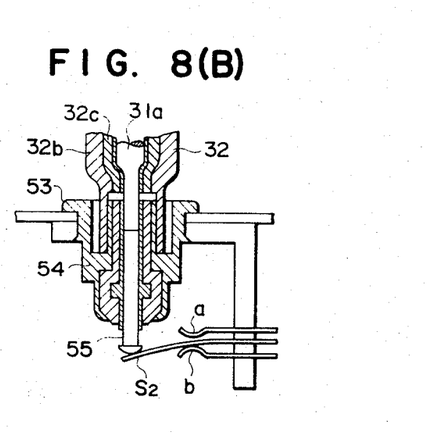
Figure 9:
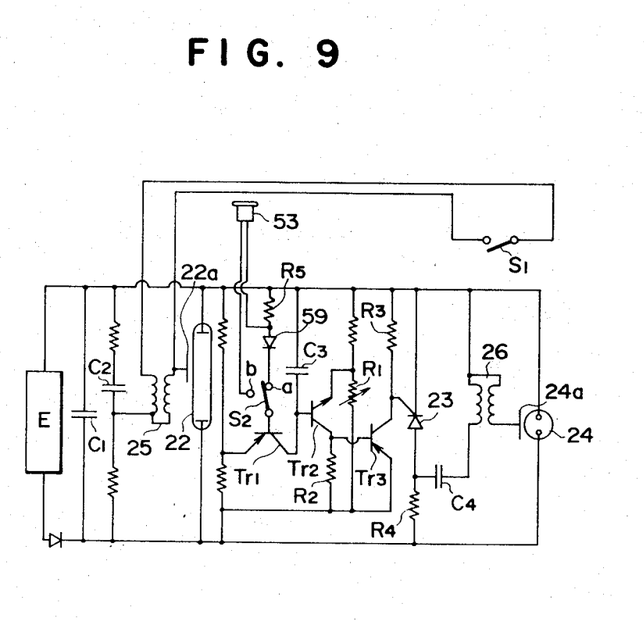
FIG. 9 is a wiring diagram of an electronic flash lighting control circuit for the embodiment of FIGS. 8A and 8B.

There is shown in FIG. 7 through FIG. 9 an embodiment in which an electronic flash circuit is provided with a light sensitive element which directly receives the light from an object and with a control circuit which integrates the current generated by the light sensitive element and controls an electronic flash tube. Wherein, the iris aperture setting of the objective lens is transmitted by making use of the exchangeable lens barrel of the first and second embodiments so that the electronic flash tube is capable of being controlled.

The electronic flash device shown in FIG. 7 is provided on its front surface with an electronic flash tube 22 and with a light receiving window 52 which is to receive the light from an object. Mounted on the back of light receiving window 52 is light sensitive element 59 as shown in FIG. 9. It is preferable that light sensitive element 59 is selected to have rapid light responsive characteristics similar to light sensitive elements 6, 106 and 206 described above.

The electronic flash device is further provided on its side surface with terminal 53 to which is connected lead lines 31a and 31b which are wired to light sensitive elements 6, 106 and 206.

With reference to FIG. 9, a lighting control circuit for an electronic flash tube will be described hereinbelow. Contrary to the arrangements that are shown in FIGS. 1 and 5 in which light sensitive elements 6 and 206 are individually connected in series through resistor $R_5$ with the base of transistor $Tr_1$, change-over switch $S_2$ is instead connected therewith in this embodiment. Also, connected in series with contact $a$ on one side of the switch $S_2$ are light sensitive element 59 of the electronic flash device and resistor $R_5$, and the other contact $b$ thereof is connected with a contact of terminal 53 of which the other contact is connected to the junction between light sensitive element 56 and resistor $R_5$. In addition, the aforesaid variable resistor $R_1$ is rearranged in this embodiment into the electronic flash device and its resistance is set so as to correspond to the film sensitivity.

With reference to FIGS. 8A and 8B pin 32a of plug 32 of the terminal 53 is wired to one of two lead lines 31a and 31b which are both connected with light sensitive element 6, 106 or 206 within the exchangeable lens barrel. The other lead line is wired to housing 32b of the plug 32, housing 32b being electrically insulated through an insulation liner 32c from pin 32a. Moreover, terminal 53 is composed of a movable pin 55 which is made of an insulating material, a conductive tube 56 on which pin 32a is retained, and into which movable pin 55 is slidably fitted. Insulative body 57 surrounds conductive tube 56, and socket 54 which is fixed on insulative body 57 and is provided with an annular groove 58 into which housing 32b is to be slidably inserted and tightly retained therein.

The lowest end of movable pin 55 is engaged with the top face of a resilient contact of change-over switch $S_2$, and the resilient contact is endowed with a biasing property due to which the resilient contact is always biased so as to push up movable pin 55 as well as to come into contact with contact $a$. Only when it is pushed down against the biasing property, is the resilient contact brought into contact with contact $b$ as shown in FIG. 8 (B).

Referring again to FIG. 9, as described hereinbefore, the base of transistor $Tr_1$ is connected to the resilient contact of change-over switch $S_2$, and contact $a$ thereof is connected with light sensitive element 59, furthermore, by means of terminal 53, conductive tube 56 thereof is to be connected to the junction between light sensitive element 59 and resistor $R_5$, and socket 54 is connected to contact $a$. Accordingly, when plug 32 is not fitted to terminal 53, resilient contact of the change-over switch $S_2$ is kept in contact with contact $a$ by its biasing property as shown in FIG. 8 (A). Therefore, light sensitive element 59 is kept interposed between the base of transistor $Tr_1$ and resistor $R_5$. Whereas, when plug 32 is inserted into terminal 53 as shown in FIG. 8 (B), pin 32a depresses movable pin 55 against the biasing force of the resilient contact of change-over switch $S_2$ so as to force the contact to come into contact with contact $b$. Thereby, light sensative element 6, 106 or 206 in the exchangeable lens barrel is capable of being interposed between the base of transistor $Tr_1$ and resistor $R_5$.

In the case of FIG. 8(A), the lighting control circuit integrates a current of light sensitive element 59 generated therein by receiving the light from an object, which light does not include information of the iris aperture setting, and controls the electronic flash tube. Whereas, in the case of FIG. 8 (B), it controls the electronic flash tube by integrating a current generated in light sensitive element 6, 106 or 206 which receives the light reflected from the light sensitive film surface, which is reflected from an object and includes information of the iris aperture setting.

What is claimed is:

1. Apparatus for controlling an electronic flash comprising:
   a lens barrel exchangeably mounted on a camera body and having an objective lens and an iris diaphragm;
   a light receptive element mounted on said lens barrel at the periphery of said objective lens facing the light sensitive film surface with said lens barrel mounted on said camera body whereby said light receptive element receives the light transmitted through said objective lens and the iris aperture and reflected from said light sensitive surface;

a power source;

means for generating an electronic flash connected in series with said power source;

a main capacitor connected with said power source across said means for generating an electronic flash for exciting said means for generating;

a trigger circuit including a trigger capacitor and a synchronous shutter switch connected in series with said trigger capacitor;

an integrating circuit including an integrating capacitor for integrating the current generated by said light receptive element in accordance with the light received thereon; and an electric timing means for controlling the excitation of said means for generating an electronic flash by extinguishing it when the integrated voltage of said integrating capacitor reaches a predetermined voltage.

2. Apparatus for controlling an electronic flash as in claim 1, further comprising:

a discharge tube having an impedance less than that of said means for generating an electronic flash and connected across said means for generating;

a discharge circuit including a capacitor and switching means for triggering said discharge tube; and a switching circuit for enabling said switching means when the integrated voltage of said integrating capacitor reaches said predetermined voltage.

3. Apparatus for controlling an electronic flash as in claim 1, wherein said means for generating an electronic flash is an annular electronic flash tube mounted in the periphery of said objective lens to face an object.

4. Apparatus for controlling an electronic flash as in claim 1, further comprising:

a condenser lens which is mounted at the periphery of said objective lens in front of the light receiving surface of said light receptive element and at a position proximate to the optical axis of said objective lens and nearer thereto than said light receptive element for collectively directing a selected portion of the light reflected on the central portion of said light sensitive film surface towards said light receptive element.

5. Apparatus for controlling an electronic flash as in claim 4, further comprising:

a shielding member including an opening therein and mounted at the periphery of said objective lens in front of the light receiving surface of said light receptive element for shielding only such light that is transmitted through said objective lens and said iris aperture and normally reflected on said light sensitive surface.

6. Apparatus for controlling an electronic flash as in claim 5, wherein said light receptive element includes a number of light sensitive elements and said shielding member includes a number of shielding elements mounted on said exchangeable lens barrel at the periphery of said objective lens and said iris aperture thereof symmetrically with respect to the optical axis thereof.

7. Apparatus for controlling an electronic flash as in claim 1, further comprising:

lead lines respectively connected to both terminals of said light receptive element in said exchangeable lens barrel;

a plug including terminals insulated from each other and individually connected with said lead lines;

a case enclosing said means for generating an electronic flash;

a connecting terminal formed on said case and mounting said plug;

a movable pin mounted within said connecting terminal and movable to projected and retracted positions in accordance with said plug being inserted into and taken out of said connecting terminal;

a change-over switch having a contact engaging said movable pin;

two contacts engaging with said contact;

said means for generating an electronic flash including a light sensitive element connected with one of said two contacts and connected with said integrating capacitor; and means connected with the other of said two contacts to connect said light sensitive element in said exchangeable lens barrel to said integrating capacitor in parallel therewith.

8. Apparatus for controlling an electronic flash as in claim 7, further comprising:

a plug including a pin connected via a lead line with one of the terminals of said light sensitive element in said exchangeable lens barrel, and a housing insulated from said pin and connected via a lead line with the other of said terminals of said light sensitive element;

a case including a connecting terminal and said case enclosing said means for generating an electronic flash, and including a conductive tube receiving said pin and having a terminal insulated from said conductive tube and connected with said plug housing;

an insulative pin engageable with said pin within said conductive tube and slidably shifted to either a protruding or retracted position with respect to said conductive tube; and a change-over switch including a contact movable to come into contact with either one of said two contacts thereof by engagement with said insulative pin.

9. Photographic apparatus comprising:

an objective lens barrel for exchangeable mounting on a photographic camera body adapted to receive a light sensitive film surface, said lens barrel comprising;

an objective lens including an iris diaphragm, a light sensitive element mounted around the periphery of said objective lens and facing the light sensitive film surface for receiving the light transmitted through said objective lens and said iris aperture and reflected from said light sensitive film surface, an electronic flash tube controlled by a control circuit, and connecting means for connecting said light sensitive element to said control circuit.

10. Photographic apparatus comprising:

an objective lens barrel for exchangeable mounting on a photographic camera body adapted to receive a light sensitive film surface, said lens barrel comprising;

an objective lens including an iris diaphragm, a light sensitive element mounted at said objective lens and facing said light sensitive film surface for receiving the light transmitted through said objective lens and said iris diaphragm and reflected from said light sensitive surface, an electronic flash tube controlled by a control circuit, and connecting means for connecting said light sensitive element to said control circuit.

* * * * *